May 22, 1928.

B. C. STICKNEY

TYPEWRITING MACHINE

Filed March 30, 1926

1,671,053

Inventor:

Burnham C. Stickney

Patented May 22, 1928.

1,671,053

UNITED STATES PATENT OFFICE.

BURNHAM C. STICKNEY, OF PORTSMOUTH, NEW HAMPSHIRE, ASSIGNOR TO UNDERWOOD ELLIOTT FISHER COMPANY, OF NEW YORK, N. Y., A CORPORATION OF DELAWARE.

TYPEWRITING MACHINE.

Original application filed July 14, 1922, Serial No. 574,866. Patent 1,583,263, dated May 4, 1926. Divided and this application filed March 30, 1926. Serial No. 98,454.

The present invention relates to platens for type-writing machines, and to processes for making the same.

An object of the invention is the production of a platen, which, in use, may be relatively noiseless, and assure ease of type-key operation, and which, nevertheless, will assure clearness of type-impressions.

A further feature of the invention is the introduction into the platen of a typewriting machine of a core or base of such character that, when the same is jacketed or faced with any one of various materials, the printing will be of high quality.

The body is formed by winding a thin web of para rubber under high tension, and stretched to the desired thinness, around a large drum until the desired thickness of rubber cushioning material is attained; the drum being preferably in the nature of an anvil which opposes inertia to the type-blows, and consists of a heavily over-weighted metal tube or cylinder. The rubber is covered with exterior wear-resisting material. The rubber and exterior material together form a tympan or surfacing for the drum, to soften and equalize the type-blows.

This application is a division of my application, Serial No. 574,866, filed July 14, 1922 (now Patent No. 1,583,263, dated May 4, 1926).

Other features and advantages will hereinafter appear.

In the accompanying drawings.

Figure 1:
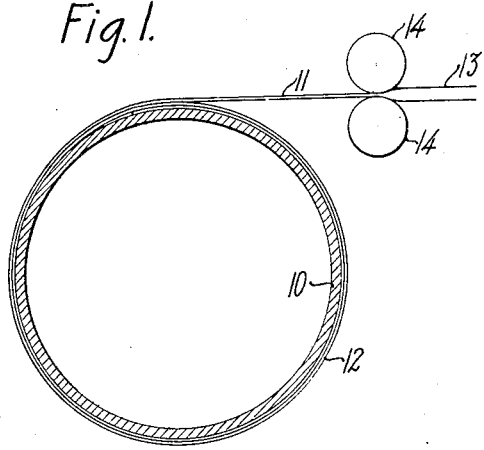
Figure 1 is a view in cross-section through a platen in the process of formation; a web of rubber being wound under high tension to form a jacket on the drum.
Figure 2:
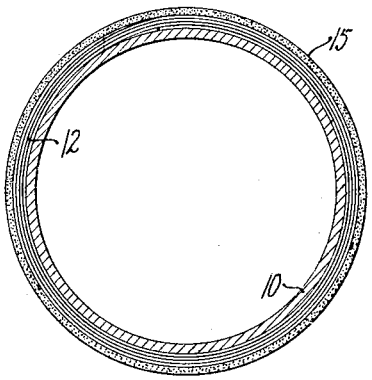
Figure 2 is a view in cross-section of the Figure 1 platen completed; a tubular jacket or facing of relatively hard rubber, celluloid, or other suitable material, being in place on the tensioned-rubber jacket.

In the embodiment of the invention shown in Figures 1 and 2, the core 10 of the platen is preferably a steel tube which may be about an inch in diameter and $\frac{1}{32}$ of an inch in thickness.

On the tube 10, a rubber web 11 is wound, under high tension, in layers to form a jacket 12 (see Figure 2) of any desired thickness. Ordinarily a thickness of from $\frac{1}{16}$ to $\frac{1}{8}$ of an inch for the jacket 12 will be sufficient and satisfactory. In forming the jacket, the rubber web is led, untensioned as indicated at 13, from any suitable source, to tensioning rolls 14, from between which it emerges under tension as indicated at 11. When wound to desired thickness, the outer end of the tensioned web is cemented, or otherwise secured, to the face of the jacket formed by the web.

The jacket 12 having been formed on the drum, an outer jacket or wearing facing therefor is provided, consisting of a thin tubular shell 15 which may be of the relatively hard rubber usually constituting the platen jacket of a typewriting machine, or which may be of celluloid or other material suitable as a backing against which typewriting may be effected. The facing-tube 15 may be slipped on over the jacket 12, but should fit the same snugly.

In a platen made as above described, the jacket or core 12 will be of great elasticity because of the high tension under which it is wound; but without yielding to the type-blows so much as untensioned soft rubber would do; and will thus conduce to clear-cut type-impressions. Such a jacket may be faced, as described, and a platen thus obtained, against which the types will strike with a muffled or deadened sound, as compared to the platens commonly in use.

Figure 3:
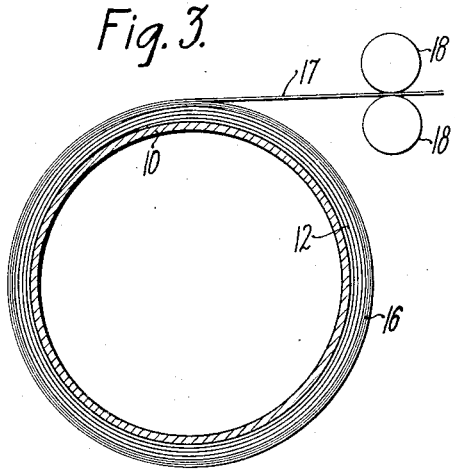
Figure 3 is a view in cross-section of a form of the invention in which a web of paper is wound over the rubber base on the drum or tubular core.
Figure 4:
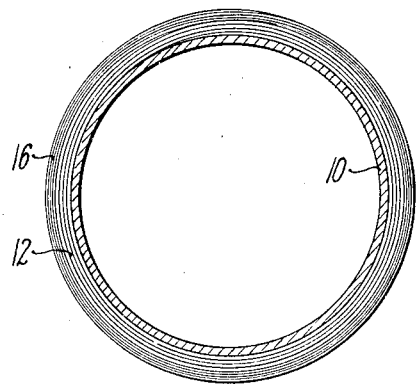
Figure 4 is a view in cross-section of the Figure 3 tube completed.

In Figures 3 and 4, the metal core 10 has the jacket 12 formed thereon of superposed windings of highly-tensioned rubber in the manner described in connection with Figures 1 and 2. The outer jacket or facing 16 in this instance is, however, formed of windings of extremely tough, thin paper 17. The paper web, led from a suitable supply-roll, passes between rolls 18 which tension the same, and thence passes to the jacket or base 12, around which it is tightly wound, layer upon layer, until the platen attains the proper diameter. At intervals a little adhesive may be applied between the windings of paper to keep them tight; and finally the end of the paper is secured by adhesive to the winding next below the same. The last few windings may, throughout the length of the same, be treated with an adhesive, such as glue or mucilage, or with shellac, or with a rubber or other cement, the more firmly to hold the same. Preferably the paper, either before or after formation of the jacket 16, is stained black.

The highly-tensioned rubber surfacing 12 in the platen of Figure 4 acts, as in the platen of Figure 2, to enhance the sharpness of type-impression, and to deaden the noise of type-strokes. In the Figure 4 form of the platen, however, the wear-resisting and type-cushioning paper jacket or facing 16 is itself highly elastic, and has other advantages, which, when it is combined, as described, with the rubber surfacing, results in a platen on which printing of the finest quality may be effected.

Variations may be resorted to within the scope of the invention, and portions of the improvements may be used without others.

Having thus described my invention, I claim:

A platen for a typewriting machine including a rigid core, a thin web of pure rubber wound repeatedly around the core and in a state of high circumferential tension and forming superposed layers thereon, and a web of thin tough paper wound repeatedly over the rubber layers and also in a condition of high circumferential tension and providing a facing for the platen.

BURNHAM C. STICKNEY.